United States Patent
Izoe et al.

(10) Patent No.: US 7,289,687 B2
(45) Date of Patent: Oct. 30, 2007

(54) POLARIZATION-MAINTAINING OPTICAL FIBER

(75) Inventors: Katsuaki Izoe, Sakura (JP); Kuniharu Himeno, Sakura (JP); Yukihiro Sakaguchi, Sakura (JP); Tatsuya Itoh, Sakura (JP)

(73) Assignee: Fujikura Ltd., Tokyo (JP)

( * ) Notice: Subject to any disclaimer, the term of this patent is extended or adjusted under 35 U.S.C. 154(b) by 335 days.

(21) Appl. No.: 10/937,495

(22) Filed: Sep. 10, 2004

(65) Prior Publication Data

US 2005/0031280 A1 Feb. 10, 2005

(30) Foreign Application Priority Data

Mar. 15, 2002 (JP) ............................. 2002-073194
Feb. 27, 2003 (JP) ............................. 2003-051194

(51) Int. Cl.
*G02B 6/00* (2006.01)
(52) U.S. Cl. ..................... 385/11; 385/12; 385/24; 385/123; 385/126; 372/6; 356/73.1; 356/460
(58) Field of Classification Search ............ 385/11–12, 385/24, 123, 126
See application file for complete search history.

(56) References Cited

U.S. PATENT DOCUMENTS

| | | | |
|---|---|---|---|
| 4,478,489 A | | 10/1984 | Blakenship et al. |
| 5,029,961 A | * | 7/1991 | Suzuki et al. ................ 385/50 |
| 5,420,949 A | * | 5/1995 | Arima et al. ................. 385/43 |
| 5,689,578 A | * | 11/1997 | Yamauchi et al. .......... 385/123 |
| 5,692,082 A | * | 11/1997 | Fukushima .................. 385/88 |
| 6,463,195 B1 | * | 10/2002 | Sasaki et al. ................ 385/43 |
| 6,687,442 B2 | * | 2/2004 | Shamoto et al. ............ 385/123 |
| 6,738,549 B2 | * | 5/2004 | Inaba et al. ................. 385/123 |
| 7,016,582 B2 | * | 3/2006 | Okazaki et al. ............. 385/123 |

(Continued)

FOREIGN PATENT DOCUMENTS

CN  1285521 A  2/2001

(Continued)

OTHER PUBLICATIONS

Sasaoka E., et al., "Polarization-maintaining fibers for fiber optical gyroscopes" Optical Fiber Sensors 1988 Technical Digest Series, vol. 2 1988, pp. 18-24, XP008066660 Washington, D.C., USA.

(Continued)

*Primary Examiner*—Frank G. Font
*Assistant Examiner*—Erin D. Chiem
(74) *Attorney, Agent, or Firm*—Sughrue Mion, PLLC

(57) ABSTRACT

A polarization-maintaining optical fiber which exhibits an excellent polarization-maintaining performance and significantly low splice loss when spliced with a polarization-maintaining optical fiber having a cladding 125 μm in diameter even if the polarization-maintaining optical fiber has a small-diameter cladding of about 80 μm. The polarization-maintaining optical fiber includes a core, a pair of stress-applying parts provided radially outwardly with respect to the core, and a cladding which surrounds the core and the stress-applying parts. With a diameter D of the stress-applying parts between 21 μm and 32 μm, a distance R between the stress-applying parts between 6 μm and 17 μm, and a relative refractive index difference Δ between 0.3% to 0.5%, a sufficiently large mode field diameter (MFD) is obtained; thus splice loss can be reduced.

19 Claims, 5 Drawing Sheets

U.S. PATENT DOCUMENTS

| | | | |
|---|---|---|---|
| 7,110,647 B2 * | 9/2006 | Farroni et al. | 385/123 |
| 7,116,887 B2 * | 10/2006 | Farroni et al. | 385/142 |
| 2002/0141717 A1 * | 10/2002 | Inaba et al. | 385/123 |
| 2005/0031280 A1 * | 2/2005 | Izoe | 385/123 |
| 2005/0135762 A1 * | 6/2005 | Ikeda et al. | 385/127 |
| 2006/0140565 A1 * | 6/2006 | Ikeda et al. | 385/126 |
| 2007/0116417 A1 * | 5/2007 | Aikawa et al. | 385/123 |

FOREIGN PATENT DOCUMENTS

| | | |
|---|---|---|
| EP | 1079247 A2 | 8/2000 |
| EP | 1085622 A1 | 3/2001 |
| JP | 60-125826 A | 7/1985 |
| JP | 61-51122 A | 3/1986 |
| JP | 61-051122 A | 3/1986 |
| JP | 2750345 | 6/1994 |
| JP | 2001-56416 A | 2/2001 |
| JP | 2001-154068 A | 6/2001 |
| JP | 2002-214465 A | 7/2002 |
| WO | WO 00/60390 A1 | 10/2000 |

OTHER PUBLICATIONS

"Polarization-maintaining Optical Fiber", Fujikura Technical Review, No. 85, Oct. 1993.

"Analytical Method for Calculation of Stress and Material Birefringence in Polarization-Maintaining Optical Fiber", J. of Lightwave Technol. vol. LT-2, No. 5, Oct. 1984.

Eisuke Sasoka et al. "Fabrication of Small Diameter Polarization Maintaining Fibers for Fiber Optical Gyroscopes", No. 2, p. 2-237, 1987.

Y. Kikuchi et al., "High Birefringence Fiber With a Small Diameter for Sensor", No. 2, p. 2-143, 1986.

Hiroshi Suganuma et al, "Characteristics of High-On Polarization Maintaining Optical Fibers", No. 4, p. 4-240, 1987.

Norihiko Nishizawa et al., "Development of Wideband Wavelength-Tunable Ultrashort Pulse Source Using Nonlinear Effects in Optical Fibers", vol. OQD-01, No. 37-46. p. 23-28. Oct. 26, 2001.

* cited by examiner

POLARIZATION-MAINTAINING OPTICAL FIBER

This application claims priority from PCT Application No. PCT/JP03/03002 filed Mar. 13, 2003, from Japanese Application No. 2002-73194 filed Mar. 15, 2003 and from Japanese Application No. 2003-51194 filed Feb. 27, 2003, which applications are incorporated herein by reference.

TECHNICAL FIELD

The present invention relates a polarization-maintaining optical fiber which includes a small-diameter cladding of about 80 μm. More specifically, the present invention relates to an optical fiber which exhibits lower splice loss compared to a conventional polarization-maintaining optical fiber having a cladding 125 μm in diameter.

BACKGROUND ART

Polarization-maintaining optical fibers have been conventionally employed as optical fibers for coupling optical components which exhibit polarization dependence.

In addition, such fibers are assembled into optical transmission components, e.g., fiber gratings and optical fiber couplers, for use in various optical transmission or measurement devices such as optical fiber gyroscopes.

For such polarization-maintaining optical fibers, polarization-maintaining optical fibers which are formed by providing stress-applying parts within a cladding at opposing sides with respect to a core to impart birefringence to the core are well known, as disclosed in U.S. Pat. No. 4,478,489 and Japanese Patent No. 2,750,345, for example. A polarization-maintaining optical fiber having such a structure are called a PANDA polarization-maintaining optical fiber (Polarization-maintaining AND Absorption-reducing optical fiber, hereinafter referred to as a "PANDA fiber"), and one of the advantageous characteristics of PANDA fibers are that PANDA fibers having an excellent polarization-maintaining performance can be manufactured with high precision.

Polarization-maintaining optical fibers having a cladding 125 μm in diameter are commonly used since such fibers are easy to manufacture, can be manufactured with a uniform quality, and easily couple to conventional optical fibers used for transmission. During a typical manufacturing process of polarization-maintaining optical fibers, a proof test has been conventionally conducted where predetermined tension is applied to fibers to be tested and broken ones are removed.

A trend toward high-capacity and high-density optical communications and the advent of high-precision optical measuring instruments have created a strong demand for reducing the size of optical transmission components and measurement apparatuses. Furthermore, an enhancement of cooling efficiency of optical transmission components and measurement apparatuses by reduction in size is also required because such devices generally include one or more heat-generating units.

However, when conventional polarization-maintaining optical fibers having a cladding 125 μm in diameter are bent with a small bending radius below 20-30 mm, problems of deteriorated performance, e.g., increased microbend loss, and compromised reliability, e.g., increased tendency to breakage, will arise. A larger bending radius is thus required when optical component are coupled using this type of optical fiber, which poses a challenge inhibiting downsizing of optical components.

As an example of polarization-maintaining optical fiber which can be bent with a bending radius smaller than 20 mm, a polarization-maintaining optical fiber having a small-diameter cladding of 80 μm used for gyroscope is known, as reported in "Polarization-maintaining Optical Fiber", Fujikura Technical Review, No. 85, October 1993.

For reducing microbend loss, this polarization-maintaining optical fiber for gyroscope is designed so that the fiber has a larger relative refractive index difference Δ between the core and the cladding (e.g., 0.8-1.2%) (hereinafter just referred to as "relative refractive index difference"), and has a smaller mode field diameter (MFD) (e.g., between 3 μm and 5 μm at a wavelength of 0.85 μm, and between 5.5 μm and 7.5 μm at 1.55 μm) than conventional polarization-maintaining optical fibers.

However, a smaller mode field diameter is disadvantageous since splice loss due to an axial offset incurred during fusion splicing tends to increase. In addition, when a fiber having a smaller mode field diameter is spliced with a telecommunication optical fiber having a cladding 125 μm in diameter, e.g., an optical fiber for transmission, splice loss due to a difference in mode field diameters becomes significant.

Although polarization-maintaining optical fiber for gyroscopes can be manufactured based on the aforementioned structural parameters because such fibers are not to be coupled with another optical fiber, splice loss is a critical issue in a polarization-maintaining optical fiber used for coupling or other applications. Therefore, structural parameters of polarization-maintaining optical fibers for gyroscope cannot be used for polarization-maintaining optical fibers used for coupling or other applications.

DISCLOSURE OF THE INVENTION

The present invention was made in view of the above-mentioned background, and an object thereof is to provide a polarization-maintaining optical fiber which has a small-diameter cladding of about 80 μm while exhibiting an excellent polarization-maintaining performance and a reduced splice loss when spliced with a polarization-maintaining optical fiber having a cladding 125 μm in diameter.

After studying the aforementioned problems, it is found by the present inventors that optimization of structural parameters, including relative refractive index difference, the distance between and the diameter of a pair of stress-applying parts could lead to a polarization-maintaining optical fiber which reduces both crosstalk and splice loss while exhibiting an excellent connectivity and polarization performance, and the present invention was completed.

The above-mentioned problems are solved by a polarization-maintaining optical fiber including a core, a pair of stress-applying parts provided radially outwardly with respect to the core, and a cladding which surrounds the core and the stress-applying parts, wherein a diameter of the cladding is between 70 μm and 90 μm, a diameter of the stress-applying parts is between 21 μm and 32 μm, a distance between the stress-applying parts is between 6 μm and 17 μm, and a relative refractive index difference between the core and the cladding is between 0.3% and 0.5%.

Preferably, in a polarization-maintaining optical fiber used for a 0.98 μm band, the diameter of the stress-applying parts is between 22 μm and 28 μm, the distance between the stress-applying parts is between 8.5 μm and 11 μm, and a modal birefringence is $3 \times 10^{-4}$ or higher, and a mode field diameter at a wavelength of 0.98 μm is between 5.3 μm and 6.5 μm for obtaining excellent performance.

Preferably, in a polarization-maintaining optical fiber used for a 1.30 µm band, the diameter of the stress-applying parts is between 22 µm and 28 µm, the distance between the stress-applying parts is between 9 µm and 13 µm, and the modal birefringence is $3 \times 10^{-4}$ or higher, and the mode field diameter at a wavelength of 1.30 µm is between 7.1 µm and 9.0 µm.

Preferably, in a polarization-maintaining optical fiber used for a 1.40-1.63 µm band, the diameter of the stress-applying parts is between 22 µm and 28 µm, the distance between the stress-applying parts is between 13 µm and 16 µm, the modal birefringence is $3 \times 10^{-4}$ or higher, and the mode field diameter at a wavelength 1.55 µm is between 8.5 µm and 10.5 µm.

The aforementioned polarization-maintaining optical fiber is suitable as a polarization-maintaining optical fiber used in an optical fiber amplifier, a semiconductor laser, and a modulator; thus smaller optical fiber amplifiers, semiconductor lasers and modulators can be fabricated.

BEST MODE FOR CARRYING OUT THE INVENTION

The present invention will now be described in detail using embodiments threreof.

Figure 1:
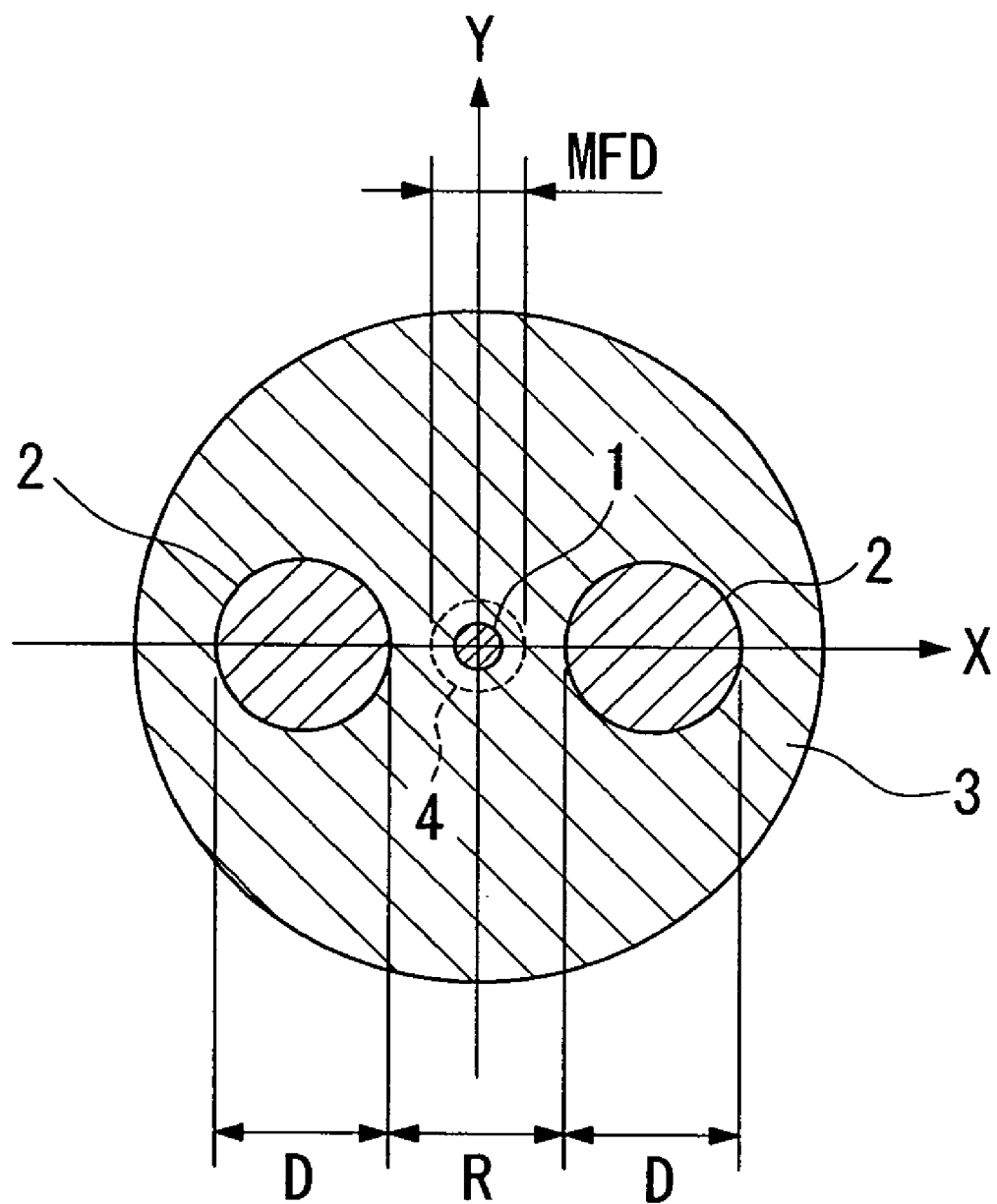
FIG. 1 is a schematic cross-sectional view exemplifying a polarization-maintaining optical fiber according to the present invention.

FIG. 1 is a schematic cross-sectional view exemplifying a polarization-maintaining optical fiber according to the present invention. Similar to a conventional PANDA polarization-maintaining optical fiber, the polarization-maintaining optical fiber according to the present invention is designed such that a pair of the stress-applying parts 2 are provided in symmetrically opposing positions with respect to a core 1, and the core 1 and the stress-applying parts 2 are surrounded by a cladding 3, as shown in FIG. 1. The core 1 is made of a material which has a higher refractive index than the material of the cladding 3, and the stress-applying part 2 is made of a material which has a higher thermal expansion coefficient than the materials of the core 1 and the cladding 3.

For these materials, any materials used for fabrication of conventional PANDA polarization-maintaining optical fibers may be used. As an example of the structure of the present embodiment, the core 1 is made of silica which contains (is doped with) germanium, each of the stress-applying parts 2 are made of $B_2O_3$—$SiO_2$ glass in which glass is doped with $B_2O_3$ such that boron concentration is between 17 wt-% and 21 wt-% in terms of weight concentration of $B_2O_3$, and the cladding 3 is made of pure silica.

In the polarization-maintaining optical fiber according to the present invention, the cladding diameter may be between 70 µm and 90 µm, and is more preferably between 77 µm and 83 µm. The diameter D of each of the stress-applying parts 2 may be between 21 µm and 32 µm, the distance R between the stress-applying parts 2 may be between 6 µm and 17 µm, relative refractive index difference Δ may be between 0.3% and 0.5%.

Thus, since a cladding has a small diameter, a bending radius of the optical fiber can be reduced to an order of 13 mm. In addition, polarization crosstalk is reduced, an excellent polarization-maintaining performance is realized, and splice loss is low when spliced with a typical telecommunication optical fiber having a cladding 125 µm in diameter.

Preferably, in a 0.98 µm-band polarization-maintaining optical fiber, the diameter of respective stress-applying parts 2 may be between 22 µm and 28 µm, the distance between the stress-applying parts 2 may be between 8.5 µm and 11 µm, and modal birefringence may be $3 \times 10^{-4}$ or higher, and the mode field diameter at a wavelength of 0.98 µm may be between 5.3 µm and 6.5 µm for obtaining excellent performance.

Preferably, in a 1.30 µm-band polarization-maintaining optical fiber, the diameter of respective stress-applying parts 2 may be between 22 µm and 28 µm, the distance between the stress-applying parts 2 may be between 9 µm and 13 µm, and modal birefringence may be $3 \times 10^{-4}$ or higher, and the mode field diameter at a wavelength of 1.30 µm may be between 7.1 µm and 9.0 µm.

Preferably, in a 1.40-1.63 µm- (1.55 µm-) band polarization-maintaining optical fiber, the diameter of respective stress-applying parts 2 may be between 22 µm and 28 µm, a distance between the stress-applying parts 2 may be between 13 µm and 16 µm, modal birefringence may be $3 \times 10^{-4}$ or higher, and the mode field diameter at a wavelength 1.55 µm may be between 8.5 µm and 10.5 µm.

Reasons why structural parameters for the polarization-maintaining optical fiber according to the present invention are set to values in the above-mentioned ranges will now be described.

It is known that polarization-maintaining performance of a polarization-maintaining optical fiber is dependent on modal birefringence B which is defined as the difference between equivalent refractive indices $n_x$, $n_y$ ($n_x - n_y$) of two polarized wave modes of the polarization-maintaining optical fiber (x and y polarized waves) which are orthogonal to each other. As modal birefringence B increases, the difference between propagation constants of two polarized wave modes increases; thus polarization-maintaining performance of this polarization-maintaining optical fiber is improved.

The modal birefringence B of the PANDA polarization-maintaining optical fiber as shown in FIG. 1 can be expressed by the following Formula (1) (P. L. Chu et. al, "Analytical Method for Calculation of Stress and Material Birefringence in Polarization-Maintaining Optical Fiber", J. of Lightwave Technol. Vol. LT-2, No.5, October 1984):

$$B \cong \frac{2EC}{1-v}(\alpha_2 - \alpha_3)T\left(\frac{d_1}{d_2}\right)^2 \cdot \left\{1 - 3\left[1 - 2\left(\frac{r}{b}\right)^2\right]\left(\frac{d_2}{b}\right)^4 + 3\left(\frac{r}{d_2}\right)^2\cos 2\theta\right\} \quad (1)$$

where B is modal birefringence, E is Young's modulus of silica, C is photoelastic coefficient, v is Poisson's ratio, $\alpha_2$ is thermal expansion coefficient of the cladding 3, $\alpha_3$ is thermal expansion coefficient of the stress-applying parts 2, T is the difference between the melting point and an actual operating temperature of the stress-applying parts 2, $d_1$ is the radius of the stress-applying parts 2, $d_2$ is the distance between the center of the core 1 and the center of the stress-applying part 2, and b is the radius of the cladding 3.

In addition, r and θ present a coordinate of a given point within the polarization-maintaining optical fiber with respect to the origin, i.e., the center of the core 1. When r=0, Formula (1) represents the central value of modal birefringence of the polarization-maintaining optical fiber.

In Formula (1), the term expressed by the following Formula (2):

$$\frac{2EC}{1-v}(\alpha_2 - \alpha_3)T \quad (2)$$

is determined by the material of which the stress-applying part 2 is made. The stress-applying part 2 is generally made of $B_2O_3$-doped silica, and the amount of boron is preferably 21 wt-% or less in terms of weight concentration of $B_2O_3$ (see, e.g., Japanese Unexamined Patent No. 2002-214465).

A typical material of the stress-applying parts 2 can be expressed using the following empirically known values: E of 7830 kg/mm$^2$, v of 0.186, and $(\alpha_2-\alpha_3)$T of $1.69\times10^{-3}$.

Furthermore, the term expressed by the following Formula (3):

$$\left(\frac{d_1}{d_2}\right)^2\left\{1 - 3\left[1 - 2\left(\frac{r}{b}\right)^2\right]\left(\frac{d_2}{b}\right)^4 + 3\left(\frac{r}{d_2}\right)^2\cos 2\theta\right\} \quad (3)$$

is determined by structural parameters of the polarization-maintaining optical fiber, and it is evident that a larger modal birefringence B can be obtained by increasing diameter D of the stress-applying parts 2 and reducing the distance R between the stress-applying parts 2.

A relationship of the diameter D of the stress-applying parts 2 versus the distance R between the stress-applying parts 2 were calculated using Formula (1) for a polarization-maintaining optical fiber having a cladding 80 µm in diameter, assuming that the modal birefringence B is a constant. The results are shown in FIG. 2.

Figure 2:
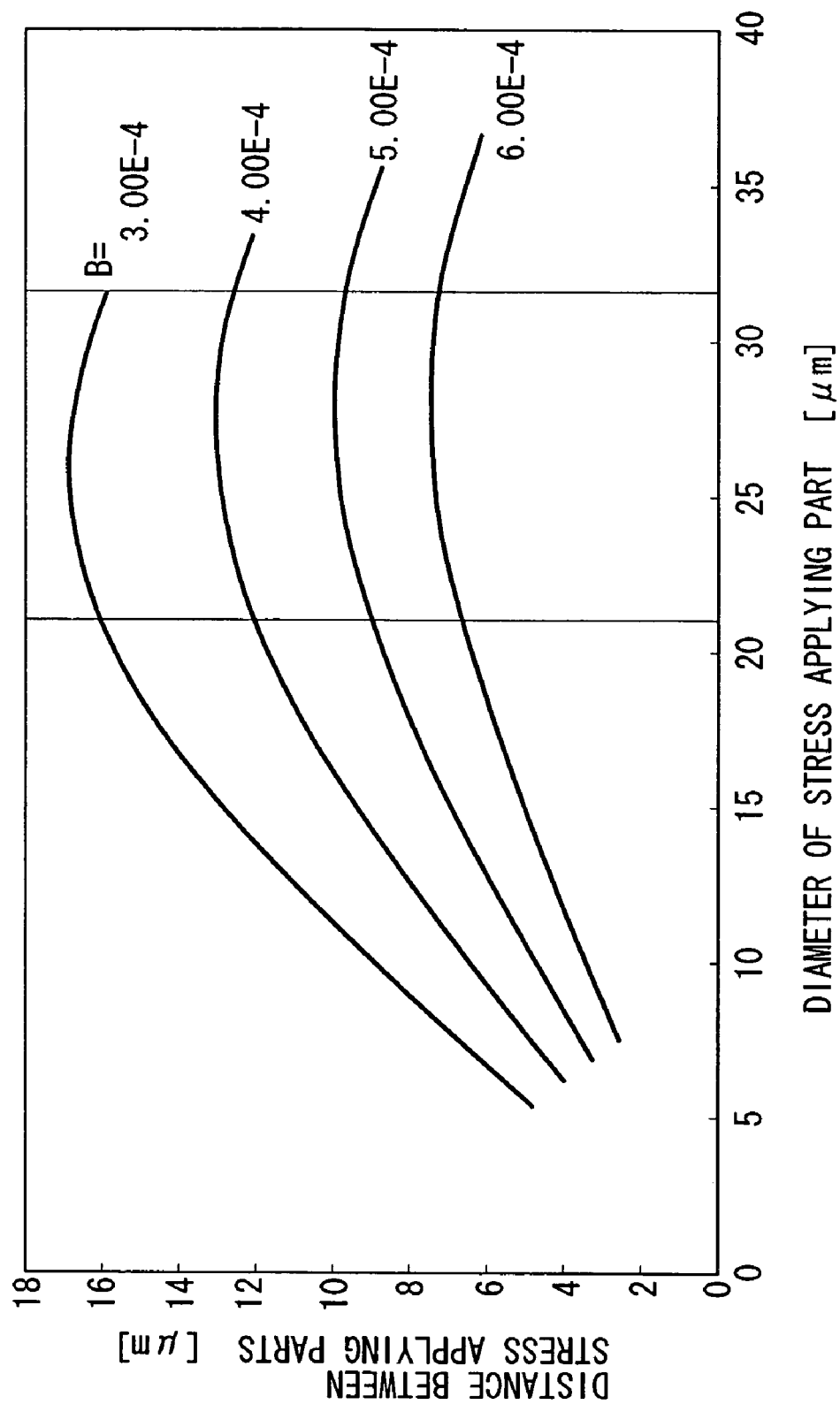
FIG. 2 is a graph depicting a relationship of diameter D of the stress-applying parts 2 versus the distance R between the stress-applying parts 2 while maintaining modal birefringence B constant.

FIG. 2 indicates that a large modal birefringence B can be achieved by reducing the distance R between the stress-applying parts 2. The distance R between the stress-applying parts 2, however, cannot be smaller than the diameter of the core 1, as shown in FIG. 1.

In a polarization-maintaining optical fiber, light typically propagates through an area which is depicted by a broken line in FIG. 1, the diameter of which is larger than that of the core 1. This area is called a mode field 4. In general, the diameter of the mode field 4, i.e., mode field diameter (MFD), is a diameter of an area where the electric field intensity caused by propagation of light becomes 1/e times (e is the base of natural logarithm) the electric field intensity at the center of the core 1.

If the distance R between the stress-applying parts 2 is small, the mode field 4 may become deformed from a circulatory shape because the stress-applying parts 2 has a lower refractive index than the cladding 3; thus splice loss is increased. In order to reduce splice loss to an order of 0.3 dB or less, non-circularity of the mode field 4 is preferably 3.2% or less, as described in Japanese Patent Application No. 2001-210648. Thus, maximizing the distance R between the stress-applying parts 2 is desirable, and the results shown in FIG. 2 indicate that the diameter D of the stress-applying parts 2 is preferably between 21 µm and 32 µm.

If the diameter D of the stress-applying parts 2 is too large, however, the distance between the periphery of the cladding 3 and the outmost region of a stress-applying part 2 becomes small; thus, a diameter ranging between 22 µm and 28 µm is particularly preferable.

It is known that modal birefringence B of $3\times10^{-4}$ or higher is preferable for a polarization-maintaining optical fiber having a cladding 125 µm in diameter. It is considered that a polarization-maintaining optical fiber becomes more susceptible to lateral pressure if a cladding diameter is in an order of 80 µm; thus modal birefringence B of $3\times10^{-4}$ or higher may provide an excellent polarization-maintaining performance. Accordingly, the results shown in FIG. 2 indicates that the distance R between the stress-applying parts 2 should be 17 µm or less.

The minimum value of the distance R between the stress-applying parts 2 will now be discussed. It is known that splice efficiency η when coupling a first and a second polarization-maintaining optical fibers is typically expressed by the following Formula (4):

$$\eta = \left(\frac{2W_1W_2}{W_1^2 + W_2^2}\right)^2 \exp\left(-\frac{2d^2}{W_1^2 + W_2^2}\right) \quad (4)$$

where $W_1$ is a radius of the mode field 4 of the first polarization-maintaining optical fiber, $W_2$ is a radius of the mode field 4 of the second polarization-maintaining optical fiber, and d is an offset between cores 1 of the first and second polarization-maintaining optical fibers (axial offset).

A condition when the axial offset d becomes 0 will be considered using Formula (4). Assuming that d=0, Formula (4) can be transformed to obtain the following Formula (5):

$$\eta = \left(\frac{2W_1W_2}{W_1^2 + W_2^2}\right)^2 \quad (5)$$

As evident from Formula (5), the greater the difference between MFDs of the first and second polarization-maintaining optical fibers becomes, the more the splice efficiency is reduced and the more splice loss is increased.

When $W_1$ equals $W_2$, Formula (4) can be transformed to obtain the following Formula (6):

$$\eta = \exp\left(-\frac{d^2}{W_1^2}\right) \quad (6)$$

As evident from Formula (6), even a small axial offset d will incur an increase in splice loss when the mode field diameter is small.

Figure 3:
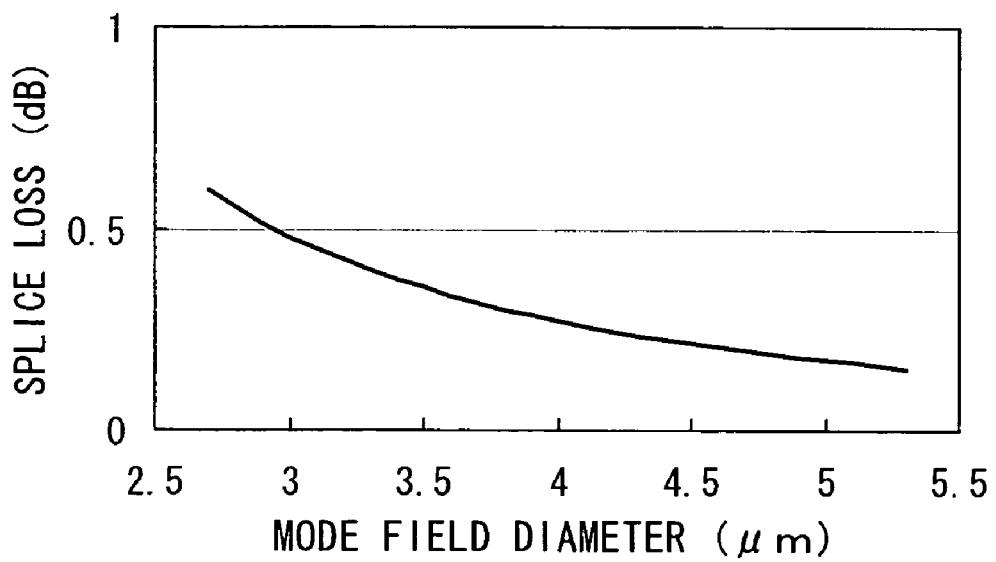
FIG. 3 is a graph exemplifying a relationship of mode field radius versus splice loss caused by an axial offset of 1 µm when $W_1 = W_2$.

Splice loss caused by an axial offset of 1 μm when $W_1=W_2$ was calculated using Formula (4), the results of which are shown in FIG. 3. This level of which axial offset may commonly be experienced.

Splice loss of 0.5 dB or less is considered desirable when splicing two polarization-maintaining optical fibers. As indicated by FIG. 3, a mode field diameter of 6 μm or greater is preferable in order to reduce splice loss caused by an axial offset of 1 μm to 0.5 dB or less. Thus, the distance R between the stress-applying parts 2 should be 6 μm or greater.

Particularly suitable ranges of the aforementioned structural parameters will now be described for wavelengths of various transmission bands of the polarization-maintaining optical fiber.

Polarization-maintaining optical fibers which are employed to couple optical components used for lightwave communications are generally used in the 0.98 μm, 1.30 μm, or 1.55 μm band. A 0.98 μm-band polarization-maintaining optical fiber is employed, for example, as a coupling pigtail for a pump laser of an erbium-doped fiber amplifier (EDFA). A 1.30 μm- or 1.55 μm-band polarization-maintaining optical fiber is employed, for example, as a coupling pigtail for a semiconductor laser or a modulator.

Generally, cut-off wavelength of a polarization-maintaining optical fiber is determined by a wavelength of transmission band, and an MFD is also roughly determined.

First, preferable ranges of structural parameters of a 0.98 μm-band polarization-maintaining optical fiber will now be discussed.

Figure 4:
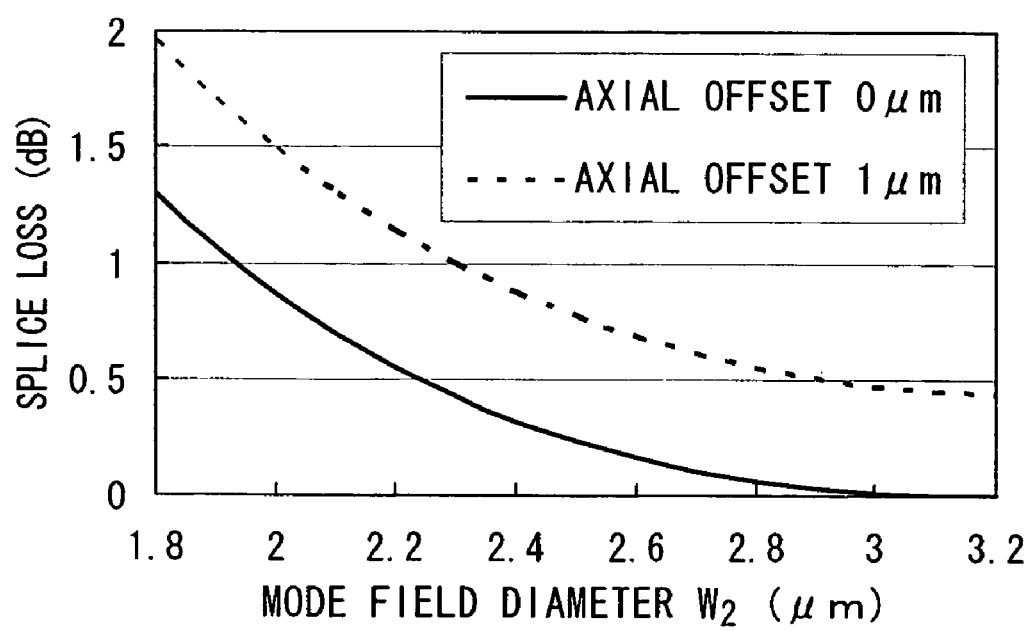
FIG. 4 is a graph depicting splice loss of a 0.98 µm-band polarization-maintaining optical fiber when spliced with another optical fibers having a different MFD with an axial offset of 1 µm.

A typical value of an MFD of a 0.98 μm-band polarization-maintaining optical fiber which has a cladding 125 μm in diameter is 6.3 μm. Splice loss when this conventional polarization-maintaining optical fiber and an optical fiber having a different MFD are spliced with an axial offset of 1 μm was calculated using Formula (4), the results of which are shown in FIG. 4.

With an axial offset of 1 μm, splice loss of 0.44 dB is incurred even when two polarization-maintaining optical fibers having the same MFD are spliced. Assuming that an increase in the splice loss is 0.2 dB in the worst case, in addition to a splice loss of 0.44 dB, the 0.98 μm-band polarization-maintaining optical fiber according to the present embodiment should have an MFD of 5.3 μm or greater. In contrast, since an excessively large MFD incurs a significant splice loss due to a misalignment between mode fields 4, an MFD at a wavelength of 0.98 μm is preferably within a range between 5.3 μm and 6.5 μm.

When an MFD at a wavelength of 0.98 μm is limited within the aforementioned range, the distance R between the stress-applying parts 2 is preferably between 8.5 μm and 11 μm. The distance R between the stress-applying parts 2 of less than 8.5 μm is not desirable since the distance between the stress-applying part 2 and the core 1 will be too small and the mode field 4 may become deformed from a circular shape, resulting in an increase in splice loss. A distance R which is more than 11 μm is not desirable because polarization-maintaining performance will be deteriorated.

Similar to the above, preferable ranges of structural parameters of a 1.40-1.63 μm-band polarization-maintaining optical fiber will now be discussed.

Figure 5:
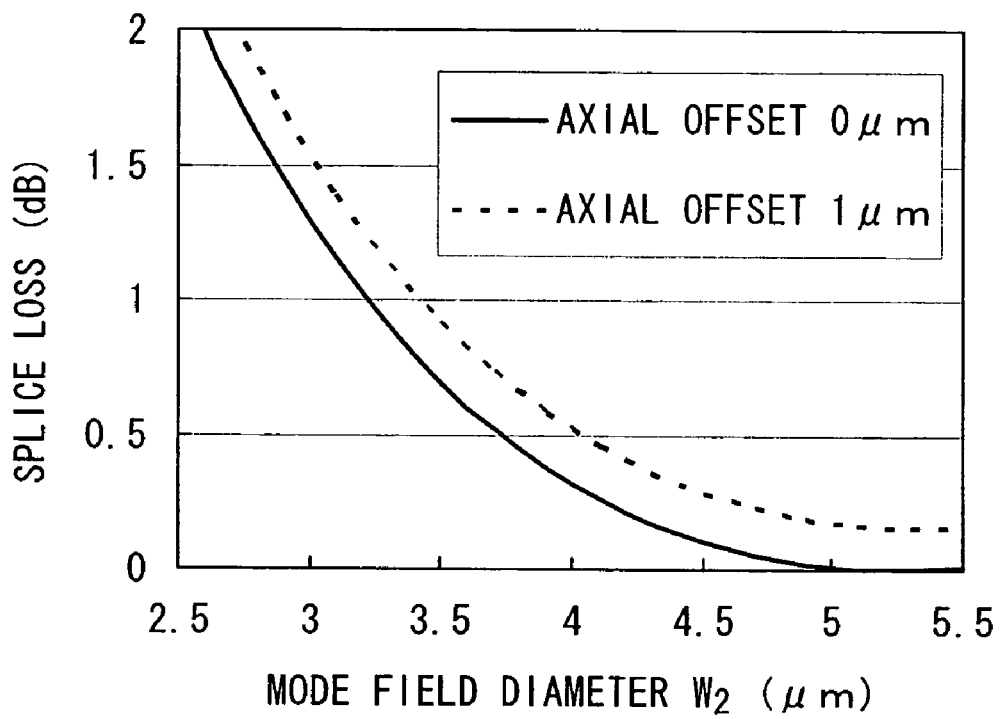
FIG. 5 is a graph depicting splice loss of a 1.40-1.63 µm-band polarization-maintaining optical fiber when spliced with another optical fibers having a different MFD with an axial offset of 1 µm.

A typical value of an MFD of a 1.40-1.63 μm-band polarization-maintaining optical fiber is 10.5 μm. Splice loss was calculated using Formula (4), the results of which are shown in FIG. 5. These results indicates that in order to reduce splice loss to 0.5 dB or less, the 1.40-1.63 μm-band polarization-maintaining optical fiber of the present embodiment should have an MFD of 8.0 μm or greater at a wavelength of 1.55 μm.

In contrast, since an excessively large MFD incurs a significant splice loss due to a misalignment between mode fields 4, an MFD is preferably within a range between 8.5 μm and 10.5 μm.

When an MFD at a wavelength of 1.55 μm is limited within the aforementioned range, the distance R between the stress-applying parts 2 is preferably between 13 μm and 16 μm. The distance R between the stress-applying parts 2 of less than 13 μm is not desirable since the distance between the stress-applying part 2 and the core 1 will be too small and the mode field 4 may become deformed from a circular shape, resulting in an increase in splice loss. A distance R which is more than 16 μm is not desirable because polarization-maintaining performance will be deteriorated.

Similar to the above, preferable ranges of structural parameters of a 1.30 μm-band polarization-maintaining optical fiber will now be discussed.

Figure 6:
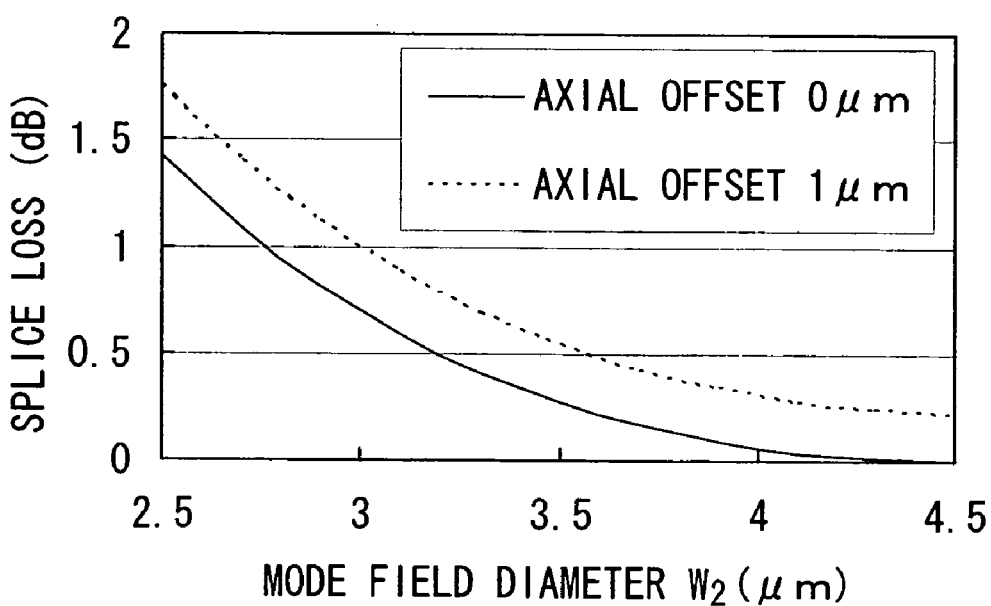
FIG. 6 is a graph depicting splice loss of a 1.30 µm-band polarization-maintaining optical fiber when spliced with another optical fibers having a different MFD with an axial offset of 1 µm.

A typical value of an MFD of a 1.30 μm-band polarization-maintaining optical fiber is 9.0 μm. Splice loss was calculated using Formula (4), the results of which are shown in FIG. 6. These results indicates that in order to reduce splice loss to 0.5 dB or less, the 1.30 μm-band polarization-maintaining optical fiber of the present embodiment should have an MFD of 7.1 μm or greater at a wavelength of 1.30 μm.

In addition, since an excessively large MFD incurs a significant splice loss due to misalignment of the mode fields 4, an MFD is preferably within a range between 7.1 μm and 9.0 μm.

When an MFD within the aforementioned range is used at a wavelength of 1.30 μm, the distance R between the stress-applying parts 2 is preferably between 9 μm and 13 μm. The distance R between the stress-applying parts 2 of less than 9 μm is not desirable since the distance between the stress-applying part 2 and the core 1 will be too small and the mode field 4 may become deformed from a circular shape, resulting in an increase in splice loss. A distance R which is more than 13 μm is not desirable because polarization-maintaining performance will be deteriorated.

As described above, the polarization-maintaining optical fiber according to the present invention exhibits an excellent polarization-maintaining performance and significantly low splice loss when spliced with a polarization-maintaining optical fiber having a cladding 125 μm in diameter even if the polarization-maintaining optical fiber has a small-diameter cladding of about 80 μm.

Accordingly, by employing this polarization-maintaining optical fiber in an optical fiber amplifier, a semiconductor laser, and a modulator, the bending radius of the fiber can be reduced; thus optical fiber amplifiers, semiconductor lasers and modulators can be significantly reduced in size compared to ones using conventional polarization-maintaining optical fibers.

EXAMPLES

The present invention will now be described in greater detail using examples; it is not intended, however, that the present invention be limited to the examples.

Polarization-maintaining optical fibers for the 0.98 µm, 1.30 µm, and 1.40-1.63 µm bands were fabricated while varying structural parameters of the fibers.

In the fabrication process of the polarization-maintaining optical fibers, first, VAD preforms including a core region made of silica doped with germanium (Ge) and a cladding region made of pure silica and have relative refractive index differences Δ of 0.25%, 0.35%, 0.4%, 0.45%, 0.6%, or 1.0% were fabricated. Core-cladding preforms for PANDA polarization-maintaining optical fibers were then obtained by depositing silica glass on the outer periphery of the preforms and sintering the preforms so that a predetermined cut-off wavelength was achieved. Holes of a predetermined diameter were provided using an ultrasonic drill in the core-cladding preforms at predetermined positions located at opposing sides with respect to the core region, and the inner surface of the holes were ground and polished to a mirror-smooth state to obtain drilled preforms.

Besides the above preforms, silica doped with boron (B) at a concentration of about 21 wt-% in terms of weight concentration of $B_2O_3$ was deposited on an inner surface of a silica tube using the MCVD method to obtain a preform to be used for formation of stress-applying parts. The silica tube surrounding the preform was removed by polishing, and the outer surface of the preform was polished to a mirror-smooth state to obtain a stress-applying preform for forming stress-applying parts of the polarization-maintaining optical fibers. The diameter of the stress-applying preform was adjusted to be about 0.5 mm smaller than the diameter of the holes provided in the preform.

Stress-applying preforms were inserted into a drilled preform and the preform was heated in a drawing furnace to draw a fiber so that a cladding 80 µm in diameter was obtained. The drawn optical fiber was coated with two ultraviolet curable acrylate resin layers to obtain an optical fiber wire. The diameter of the primary coating was about 122 µm and the diameter of the secondary coating was about 165 µm.

Propagation loss of the resultant polarization-maintaining optical fibers and polarization crosstalk when wound about a shipping bobbin were determined. Fusion splice losses with a polarization-maintaining optical fiber having a cladding 125 µm in diameter were also measured.

Figure 7:
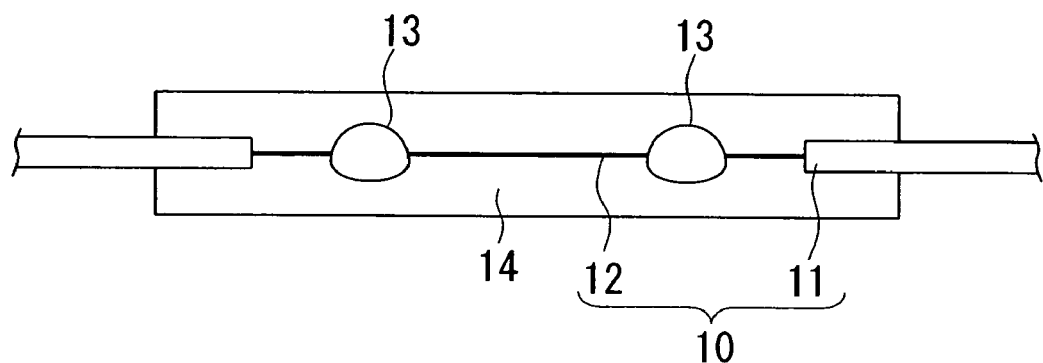
FIG. 7 is a diagram illustrating a method for evaluating deterioration of polarization-maintaining performance of the fiber caused by application of adhesive.

Furthermore, to evaluate deterioration of polarization-maintaining performance caused by application of adhesive used for assembling optical components, about 30 mm to 40 mm of coating 11 of an optical fiber wire 10 to be evaluated was removed to expose a bare optical fiber 12, as shown in FIG. 7, and the bare optical fiber was adhered to a base 14 using epoxy adhesive 13. After the adhesive was cured, polarization crosstalk of the optical fiber wire 10 was measured.

Tables 1-6 list the results and structural parameters of the polarization-maintaining optical fibers.

TABLE 1

|  | Ex 1-1 | Ex 1-2 | Ex 1-3 | Ex 1-4 | Ex 1-5 | Ex 1-6 |
|---|---|---|---|---|---|---|
| Structural parameters |  |  |  |  |  |  |
| Relative refractive index difference Δ (%) | 0.25 | 0.35 | 0.4 | 0.45 | 0.6 | 1.0 |
| Stress-applying part diameter D (µm) | 23 | 23 | 23 | 23 | 23 | 23 |
| Ratio of stress-applying parts distance R to MFD | 1.6 | 1.6 | 1.6 | 1.6 | 1.6 | 1.5 |
| Distance R between stress-applying parts (µm) | 16.8 | 16.0 | 14.8 | 14.2 | 11.9 | 8.9 |
| MFD at wavelength of 1.55 µm (µm) | 10.5 | 10.0 | 9.2 | 8.8 | 7.4 | 6.0 |
| Performance measurement results |  |  |  |  |  |  |
| Splice loss when spliced with optical fiber having MFD of 10.5 µm (dB) | 0.01 | 0.03 | 0.12 | 0.18 | 0.52 | 1.25 |
| Modal birefringence (×$10^{-4}$) | 2.6 | 3.0 | 3.2 | 3.4 | 3.7 | 4.9 |
| Crosstalk degradation due to adhesive (dB) | −5.9 | −14.2 | −15.8 | −16.2 | −17.0 | −18.2 |
| Crosstalk when wound on the bobbin (dB/100 m) | −13.0 | −22.1 | −23.9 | −25.0 | −27.5 | −28.9 |

TABLE 2

|  | Ex 1-7 | Ex 1-8 | Ex 1-3 | Ex 1-9 | Ex 1-10 | Ex 1-11 |
|---|---|---|---|---|---|---|
| Structural parameters |  |  |  |  |  |  |
| Relative refractive index difference Δ (%) | 0.4 | 0.4 | 0.4 | 0.4 | 0.4 | 0.4 |
| Stress-applying part diameter D (µm) | 23 | 23 | 23 | 23 | 23 | 23 |
| Ratio of stress-applying parts distance R to MFD | 1.8 | 1.7 | 1.6 | 1.5 | 1.4 | 1.1 |
| Distance R between stress-applying parts (µm) | 16.2 | 15.5 | 14.8 | 13.5 | 12.9 | 10.0 |
| MFD at wavelength of 1.55 µm (µm) | 9.2 | 9.2 | 9.2 | 9.2 | 9.2 | 9.2 |
| Performance measurement results |  |  |  |  |  |  |
| Wavelength loss at 1.55 µm (dB) | 0.40 | 0.45 | 0.50 | 0.62 | 0.93 | 2.09 |
| Mode field non-circularity (%) | 1.8 | 2.0 | 2.9 | 3.1 | 7.0 | 9.9 |
| Modal birefringence B (×$10^{-4}$) | 2.8 | 3.0 | 3.2 | 3.6 | 3.9 | 4.8 |

TABLE 2-continued

|  | Ex 1-7 | Ex 1-8 | Ex 1-3 | Ex 1-9 | Ex 1-10 | Ex 1-11 |
|---|---|---|---|---|---|---|
| Crosstalk degradation due to adhesive (dB) | −6.0 | −14.9 | −15.8 | −17.2 | −17.6 | −18.5 |
| Crosstalk when wound on the bobbin(dB/100 m) | −12.8 | −23.8 | −23.9 | −27.4 | −27.8 | −29.5 |

TABLE 3

|  | Ex 2-1 | Ex 2-2 | Ex 2-3 | Ex 2-4 | Ex 2-5 | Ex 2-6 |
|---|---|---|---|---|---|---|
| Structural parameters |  |  |  |  |  |  |
| Relative refractive index difference Δ (%) | 0.25 | 0.35 | 0.4 | 0.45 | 0.6 | 1.0 |
| Stress-applying part diameter D (μm) | 23 | 23 | 23 | 23 | 23 | 23 |
| Ratio of stress-applying partsdistance R to MFD | 1.6 | 1.6 | 1.6 | 1.6 | 1.6 | 1.8 |
| Distance R between stress-applying parts (μm) | 11.8 | 9.9 | 9.2 | 8.8 | 7.6 | 6.9 |
| MFD at wavelength of 0.98 μm (μm) | 7.4 | 6.2 | 5.7 | 5.5 | 4.7 | 3.8 |
| Performance measurement results |  |  |  |  |  |  |
| Splice loss when spliced with optical fiber having MFD of 6.3 μm (dB) | 0.30 | 0.29 | 0.29 | 0.33 | 0.49 | 1.18 |
| Modal birefringence (×10$^{-4}$) | 4.2 | 4.8 | 4.9 | 5.9 | 5.7 | 6.1 |
| Crosstalk degradation due to adhesive (dB) | −8.2 | −15.1 | −18.1 | −19.5 | −20.7 | −20.8 |
| Crosstalk when wound on the bobbin(dB/100 m) | −28.0 | −29.5 | −29.6 | −30.1 | −33.7 | −34.2 |

TABLE 4

|  | Ex 2-7 | Ex 2-8 | Ex 2-3 | Ex 2-9 | Ex 2-10 | Ex 2-11 |
|---|---|---|---|---|---|---|
| Structural parameters |  |  |  |  |  |  |
| Relative refractive index difference Δ (%) | 0.4 | 0.4 | 0.4 | 0.4 | 0.4 | 0.4 |
| Stress-applying part diameter D (μm) | 23 | 23 | 23 | 23 | 23 | 23 |
| Ratio of stress-applying patrs distance R to MFD | 2.0 | 1.9 | 1.6 | 1.5 | 1.4 | 1.1 |
| Distance R between stress-applying parts (μm) | 11.3 | 10.8 | 9.2 | 8.6 | 8.0 | 6.3 |
| MFD at wavelength of 0.98 μm (μm) | 5.7 | 5.7 | 5.7 | 5.7 | 5.7 | 5.7 |
| Performance measurement results |  |  |  |  |  |  |
| Wavelength loss at 0.98 μm (dB) | 0.47 | 0.48 | 0.50 | 0.50 | 0.51 | 0.73 |
| Mode field non-circularity (%) | 0.8 | 0.9 | 2.5 | 3.1 | 6.8 | 9.8 |
| Modal birefringence B (×10$^{-4}$) | 4.2 | 4.3 | 4.9 | 5.1 | 5.6 | 6.1 |
| Crosstalk degradation due to adhesive (dB) | −8.0 | −15.9 | −18.1 | −20.3 | −20.5 | −20.9 |
| Crosstalk when wound on the bobbin (dB/100 m) | −27.3 | −30. | −29.6 | −31.0 | −33.3 | −35.2 |

TABLE 5

|  | Ex 3-1 | Ex 3-2 | Ex 3-3 | Ex 3-4 | Ex 3-5 | Ex 3-6 |
|---|---|---|---|---|---|---|
| Structural parameters |  |  |  |  |  |  |
| Relative refractive index difference Δ (%) | 0.25 | 0.3 | 0.4 | 0.45 | 0.6 | 1.0 |
| Stress-applying part diameter D (μm) | 23 | 23 | 23 | 23 | 23 | 23 |
| Ratio of stress-applying parts distance R to MFD | 1.6 | 1.6 | 1.6 | 1.6 | 1.6 | 1.6 |
| Distance R between stress-applying parts (μm) | 15.4 | 12.5 | 11.5 | 11.1 | 8.9 | 8.5 |
| MFD at wavelength of 1.30 μm (μm) | 9.6 | 7.8 | 7.2 | 7.1 | 5.7 | 5.2 |
| Performance measurement results |  |  |  |  |  |  |
| Splice loss when spliced with optical fiber having MFD of 9.0 μm (dB) | 0.03 | 0.05 | 0.20 | 0.25 | 0.35 | 1.28 |
| Modal birefringence (×10$^{-4}$) | 3.0 | 3.4 | 4.2 | 4.4 | 4.9 | 5.2 |
| Crosstalk degradation due to adhesive (dB) | −7.0 | −15.0 | −16.8 | −17.3 | −18.9 | −19.2 |
| Crosstalk when wound on the bobbin (dB/100 m) | −20.1 | −26.9 | −28.0 | −28.1 | −29.0 | −30.0 |

TABLE 6

|  | Ex 3-7 | Ex 3-8 | Ex 3-3 | Ex 3-9 | Ex 3-10 | Ex 3-11 |
|---|---|---|---|---|---|---|
| Structural parameters |  |  |  |  |  |  |
| Relative refractive index difference Δ (%) | 0.4 | 0.4 | 0.4 | 0.4 | 0.4 | 0.4 |
| Stress-applying part diameter D (μm) | 23 | 23 | 23 | 23 | 23 | 23 |
| Ratio of stress-applying parts distance R to MFD | 1.9 | 1.7 | 1.6 | 1.5 | 1.2 | 1.1 |
| Distance R between stress-applying parts (μm) | 13.5 | 12.5 | 11.5 | 10.5 | 8.9 | 7.9 |
| MFD at wavelength of 1.30 μm (μm) | 7.2 | 7.2 | 7.2 | 7.2 | 7.2 | 7.2 |
| Performance measurement results |  |  |  |  |  |  |
| Wavelength loss at 1.30 μm (dB) | 0.80 | 0.88 | 0.92 | 0.95 | 1.20 | 1.50 |
| Mode field non-circularity (%) | 0.8 | 0.9 | 2.7 | 2.9 | 7.1 | 9.9 |
| Modal birefringence B (×$10^{-4}$) | 3.2 | 3.9 | 4.2 | 4.5 | 4.9 | 5.5 |
| Crosstalk degradation due to adhesive (dB) | −8.2 | −16.3 | −16.8 | −18.1 | −19.3 | −23.0 |
| Crosstalk when wound on the bobbin (dB/100 m) | −20.3 | −27.1 | −28.0 | −29.9 | −29.9 | −33.0 |

The 1.40-1.63 μm-band polarization-maintaining optical fibers were evaluated by varying relative refractive index differences Δ while maintaining the ratio of the stress-applying part distance R to the MFD constant in order to maintain the effect of the stress-applying parts 2 on the mode field 4 constant. Table 1 lists the results.

When fusion-spliced with a polarization-maintaining optical fiber having a cladding 125 μm in diameter, the polarization-maintaining optical fibers of Examples 1-1, 1-2, 1-3, and 1-4 exhibited significantly lower splice loss than the fibers of Examples 1-5 and Example 1-6. Furthermore, the fibers of Examples 1-2, 1-3, and 1-4 had lower polarization crosstalk than the fiber of Example 1-1 both when adhesive was applied and when the fibers were wound about a bobbin, indicating that the fibers of Examples 1-2, 1-3, and 1-4 have both excellent connectivity and satisfactory polarization-maintaining performance.

The 1.40-1.63 μm band polarization-maintaining optical fibers were evaluated by varying the distances R between the stress-applying parts 2 while maintaining the relative refractive index differences Δ and the MFDs constant. Table 2 lists the results.

The 0.98 μm-band polarization-maintaining optical fibers were evaluated by varying relative refractive index differences Δ while maintaining the ratio of the stress-applying part distance R to the MFD constant in order to maintain the effect of the stress-applying parts 2 on the mode field 4 constant. Table 3 lists the results.

When fusion-spliced with a polarization-maintaining optical fiber having a cladding 125 μm in diameter, the polarization-maintaining optical fibers of Examples 2-1, 2-2, 2-3, and 2-4 had significantly lower splice loss than the fibers of Examples 2-5 and Example 2-6. Furthermore, the fibers of Examples 2-2, 2-3, and 2-4 exhibited lower polarization crosstalk than the fiber of Example 2-1 both when adhesive was applied and when the fibers were wound about a bobbin, indicating that the fibers of Examples 2-2, 2-3, and 2-4 have both excellent connectivity and satisfactory polarization-maintaining performance.

The 0.98 μm-band polarization-maintaining optical fibers were evaluated by varying the distances R between the stress-applying parts 2 while maintaining the relative refractive index differences Δ and the MFDs constant. Table 4 lists the results.

The 1.30 μm-band polarization-maintaining optical fibers were evaluated by varying relative refractive index differences Δ while maintaining the ratio of the stress-applying part distance R to the MFD constant in order to maintain the effect of the stress-applying parts 2 on the mode field 4 constant. Table 5 lists the results.

When fusion-spliced with a polarization-maintaining optical fiber having a cladding 125 μm in diameter, the polarization-maintaining optical fibers of Examples 3-1, 3-2, 3-3, and 3-4 had significantly lower splice loss than the fibers of Examples 3-5 and Example 3-6. Furthermore, the fibers of Examples 3-2, 3-3, and 3-4 exhibited lower polarization crosstalk than the fiber of Example 3-1 both when adhesive was applied and when the fibers were wound about a bobbin, indicating that the fibers of Examples 3-2, 3-3, and 3-4 have both excellent connectivity and satisfactory polarization-maintaining performance.

The 1.30 μm band polarization-maintaining optical fibers were evaluated by varying the distances R between the stress-applying parts 2 while maintaining the relative refractive index differences Δ and the MFDs constant. Table 6 lists the results.

Next, an optical fiber amplifier was fabricated by the following procedure in order to evaluate how far an optical fiber amplifier can be reduced in size using the polarization-maintaining optical fiber according to the present invention.

A preform for an erbium-doped optical fiber (EDF) was fabricated using the core-cladding preform mentioned above, and a polarization maintaining EDF was manufactured by the same fabrication method as the aforementioned examples. Table 7 lists the performances of this EDF.

TABLE 7

| Structural parameters |  |
|---|---|
| Relative refractive index difference Δ (%) | 1.3 |
| Stress-applying part diameter D (μm) | 23 |
| Ratio of stress-applying part distance R to MFD | 1.6 |
| Distance R between stress-applying parts (μm) | 8.5 |
| MFD at wavelength of 0.98 μm (μm) | 5.3 |
| Performance measurement results |  |
| Modal birefringence B (×$10^{-4}$) | 4.8 |
| Crosstalk when wound on the bobbin (dB/100 m) | −30.5 |

Figure 8:
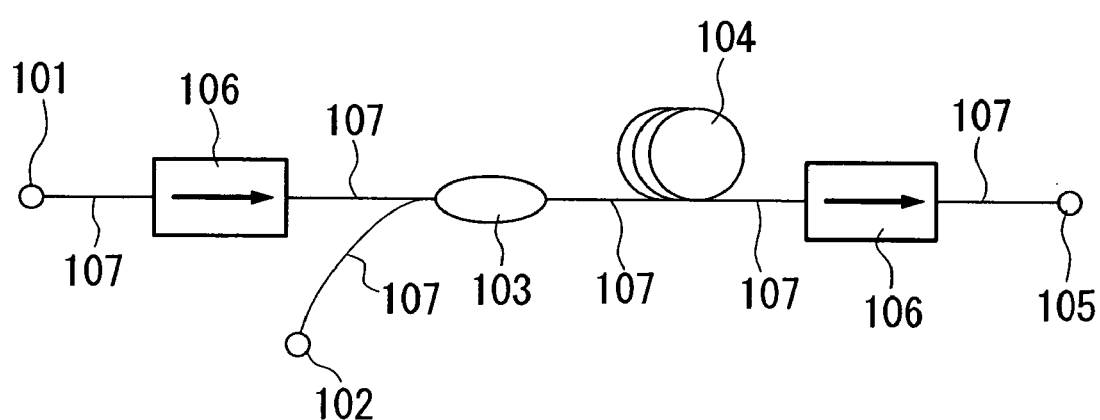
FIG. 8 is a schematic diagram exemplifying a polarization maintaining optical fiber amplifier.

Then, a polarization maintaining optical fiber amplifier shown in FIG. 8 was fabricated using this polarization maintaining EDF. This optical fiber amplifier was assembled in a typical configuration, and included a signal light input port 101, a pump light input port 102, a 980 nm to 1550 nm polarization maintaining optical coupler 103, a polarization maintaining EDF 104, a signal light output port 105, and two polarization maintaining optical isolators 106. Those components were coupled by coupling optical fibers 107.

The outer dimension of the amplifier which included the conventional polarization-maintaining optical fibers having a outer diameter of 125 µm as coupling optical fibers 107 was 140 mm×90 mm×15 mm since bending radius of the optical fibers 107 could not be reduced to 20 mm or less.

In contrast, the outer dimension of the amplifier which included the 1.40-1.63 µm-band polarization-maintaining optical fibers of Example 1-3 or the 0.98 µm-band polarization-maintaining optical fiber of Example 2-3 as the coupling optical fibers 107 was 90 mm×70 mm×15 mm since the bending radius of coupling optical fibers 107 could be reduced to about 13 mm. A polarization maintaining optical fiber amplifier which has a volume about a half of a conventional amplifier could be manufactured.

INDUSTRIAL APPLICABILITY

As described above, the polarization-maintaining optical fiber according to the present invention exhibits an excellent polarization-maintaining performance and significantly low splice loss when spliced with a polarization-maintaining optical fiber having a cladding 125 µm in diameter even if the polarization-maintaining optical fiber has a small-diameter cladding of 70 µm to 90 µm, more preferably 77 µm to 83 µm.

Accordingly, by employing this polarization-maintaining optical fiber in optical transmission components, e.g., an optical fiber amplifier, a semiconductor laser, and a modulator, or optical transmission or measurement devices, the bending radius of the fiber can be reduced; thus these components can be significantly reduced in size compared to ones using conventional polarization-maintaining optical fibers.

The invention claimed is:

1. A polarization-maintaining optical fiber comprising:
   a core;
   a pair of stress-applying parts provided radially outwardly with respect to the core; and
   a cladding which surrounds the core and the stress-applying parts,
   wherein a diameter of the cladding is between 70 µm and 90 µm, a diameter of each of the stress-applying parts is between 21 µm and 32 µm, a distance between the stress-applying parts is between 6 µm and 17 µm, and a relative refractive index difference between the core and the cladding is between 0.3% and 0.5%.

2. The polarization-maintaining optical fiber according to claim 1, wherein the polarization-maintaining optical fiber is used for a 0.98 µm band and
   the diameter of each of the stress-applying parts is between 22 µm and 28 µm, the distance between the stress-applying parts is between 8.5 µm and 11 µm, and a modal birefringence is $3\times10^{-4}$ or higher, and a mode field diameter at a wavelength of 0.98 µm is between 5.3 µm and 6.5 µm.

3. The polarization-maintaining optical fiber according to claim 1, wherein the polarization-maintaining optical fiber is used for a 1.3 µm band and
   the diameter of each of the stress-applying parts is between 22 µm and 28 µm, the distance between the stress-applying parts is between 9 µm and 13 µm, a modal birefringence is $3\times10^{-4}$ or higher, a mode field diameter at a wavelength of 1.30 µm is between 7.1 µm and 9.0 µm.

4. The polarization-maintaining optical fiber according to claim 1, wherein the polarization-maintaining optical fiber is used for a 1.40-1.63 µm band and
   the diameter of each of the stress-applying parts is between 22 µm and 28 µm, the distance between the stress-applying pans is between 13 µm and 16 µm, a modal birefringence is $3\times10^{-4}$ or higher, and the mode field diameter at a wavelength 1.55 µm is between 8.5 µm and 10.5 µm.

5. An optical fiber amplifier comprising the polarization-maintaining optical fiber according to claim 1.

6. A semiconductor laser comprising the polarization-maintaining optical fiber according to claim 1.

7. A modulator comprising the polarization-maintaining optical fiber according to claim 1.

8. The polarization-maintaining optical fiber according to claim 1, wherein the core comprises silica which contains germanium, each of the stress-applying parts comprises $B_2O_3$—$SiO_2$ glass in which glass is doped with $B_2O_3$ such that boron concentration is between 17 wt-% and 21 wt-% in terms of weight concentration of $B_2O_3$, and the cladding comprises pure silica.

9. The polarization-maintaining optical fiber according to claim 1, wherein a bending radius of the optical fiber is on the order of 13 mm.

10. A system comprising the polarization-maintaining optical fiber according to claim 1 spliced with a telecommunication optical fiber having a cladding 125 µm in diameter.

11. An optical fiber amplifier comprising the polarization-maintaining optical fiber according to claim 2.

12. An optical fiber amplifier comprising the polarization-maintaining optical fiber according to claim 3.

13. An optical fiber amplifier comprising the polarization-maintaining optical fiber according to claim 4.

14. A semiconductor laser comprising the polarization-maintaining optical fiber according to claim 2.

15. A semiconductor laser comprising the polarization-maintaining optical fiber according to claim 3.

16. A semiconductor laser comprising the polarization-maintaining optical fiber according to claim 4.

17. A modulator comprising the polarization-maintaining optical fiber according to claim 2.

18. A modulator comprising the polarization-maintaining optical fiber according to claim 3.

19. A modulator comprising the polarization-maintaining optical fiber according to claim 4.

* * * * *

UNITED STATES PATENT AND TRADEMARK OFFICE
CERTIFICATE OF CORRECTION

| | | |
|---|---|---|
| PATENT NO. | : 7,289,687 B2 | Page 1 of 1 |
| APPLICATION NO. | : 10/937495 | |
| DATED | : October 30, 2007 | |
| INVENTOR(S) | : Katsuaki Izoe et al. | |

It is certified that error appears in the above-identified patent and that said Letters Patent is hereby corrected as shown below:

On the Title Page, After Item (22) Insert (63)
--Domestic Application Priority Data
This is a continuation of International Application No. PCT/JP03/03002, filed March 13, 2003.--

Signed and Sealed this

Twenty-ninth Day of April, 2008

JON W. DUDAS
*Director of the United States Patent and Trademark Office*